Sept. 9, 1952            A. R. DE BURGH            2,609,915
CONVEYING APPARATUS
Filed March 10, 1949                                            2 SHEETS—SHEET 1
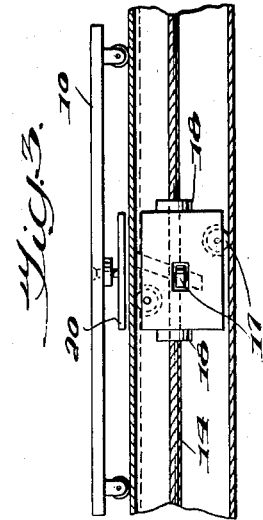
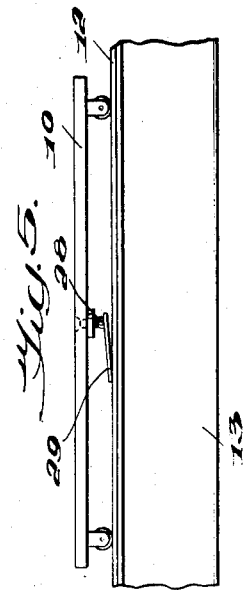
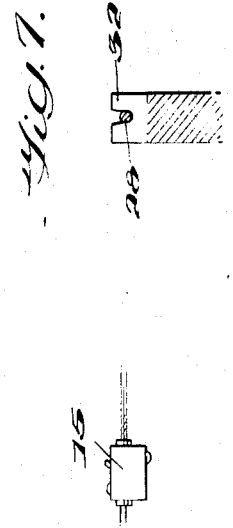
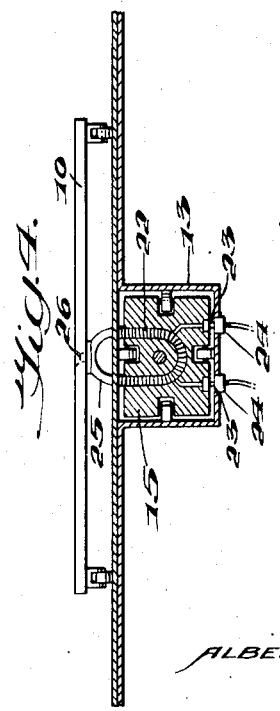
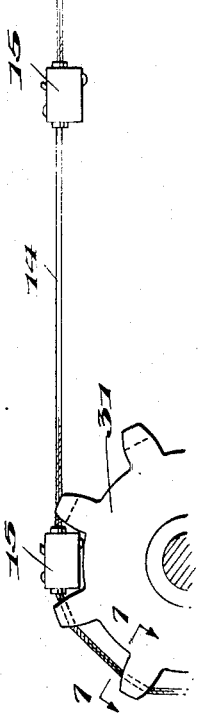
Inventor
ALBERT R. DeBURGH,
By Robert B. Larson
Attorney Sept. 9, 1952 A. R. DE BURGH 2,609,915
CONVEYING APPARATUS
Filed March 10, 1949 2 SHEETS—SHEET 2
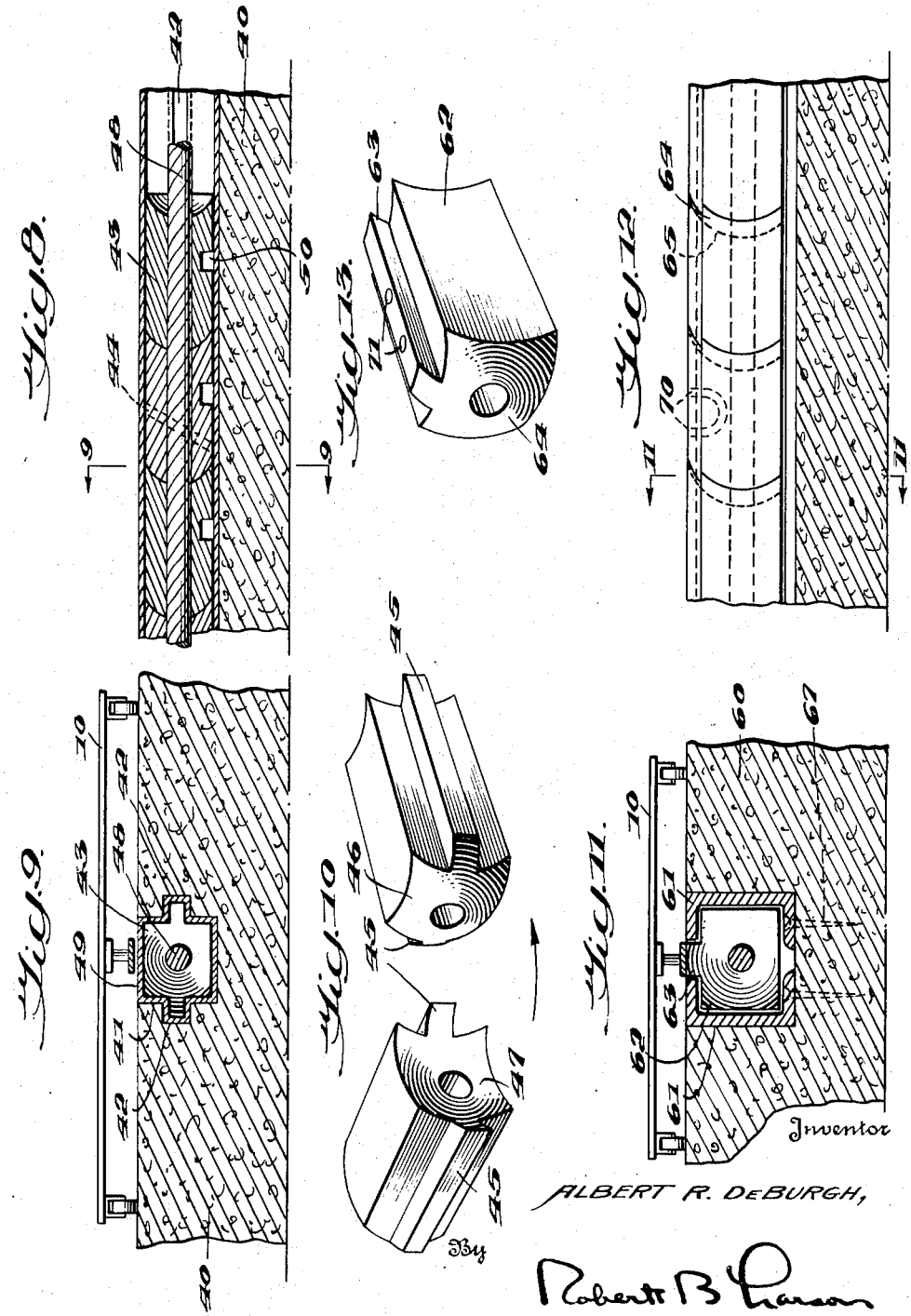
Inventor
ALBERT R. DeBURGH,
By Robert B Larson
ATTORNEY

UNITED STATES PATENT OFFICE 2,609,915

CONVEYING APPARATUS

Albert R. De Burgh, Redondo Beach, Calif.

Application March 10, 1949, Serial No. 80,740

21 Claims. (Cl. 198—41)

This invention relates to conveying apparatus, and more particularly to an improved manner of transmitting movement to carrier means forming a conveyor.

In the mass production methods in use by industry today, conveyors are widely used so that as the articles being manufactured are moved along the lines, various work operations can be performed in succession upon the articles carried by the conveyor. Improved conveyor systems are disclosed in my Patent No. 2,317,675, issued April 27, 1943.

In many of the assembly lines in use today, the articles being assembled or otherwise worked upon are carried by pallets, dollys, trucks or other types of supports which carry the articles through a succession of work stations, in which various operations such as drying or other processing steps are carried out, one object being to eliminate handling or transportation during such processing. Numerous ways of providing motive power for these carriers have been provided, but in all of the prior art structures, there is a connection between some moving part, such as a chain or cable below or above the moving carrier and the carriers themselves. In order to provide this connection in some types of conveyors, there is at least a narrow opening extending along the path of movement of the carriers, and it is the elimination of this opening which is one of the important objects of this invention.

In conveyors having the type of opening or slot as I have described above, small parts sometimes fall into and block the slots or the moving parts below the slots, thereby necessitating delays in production while the slots are cleaned or damaged parts are replaced. In cases where small assembly parts are being used, such as in the manufacture of radio chassis or adding machines, etc., the small assembly parts themselves may inadvertently be dropped into the slot in the conveyor and become damaged or destroyed, and this makes it even more desirable that the slot be eliminated.

This invention accomplishes elimination of the undesirable slot by providing an unbroken cover or separation between the moving carriers and the parts for moving the carriers, the power being transmitted from the moving parts to the carriers by means of magnetic force. It is therefore an important object of my invention to provide a conveyor utilizing magnetic force for transmitting motive power from power driven means to carriers or other work supports which are to be moved.

This invention further relates to a transportation conveyor which through novel means eliminates visible structures and provides an unobstructed, unbroken floor space. This would be particularly useful, for example, in a warehouse where it would be advantageous to operate lift trucks or otherwise provide for movement, unhindered by conveyor structure, from one part of the warehouse to other parts thereof. It is an object of the invention to provide such a conveyor.

In conveyors built in accordance with my invention and intended for use in the floors of warehouses and the like where they may be subjected to heavy crushing loads, such as when heavily loaded trucks pass over the conveyor, it may be desirable to construct the guideway in the floor and the elements riding within the guideway so that these elements substantially fill the guideway, leaving only sufficient lateral clearance between the elements and the walls of the guideway to permit the presence of a lubricating substance which would decrease friction and facilitate free movement of the elements within the guideway. The elements within the guideway could conveniently comprise blocks of non-magnetic material, some or all of which would carry a magnet, or, alternatively, the blocks carrying the magnets could be replaced by blocks made of material capable of acting as a magnet. It is convenient to refer to the blocks carrying magnets or made of magnetic material, as being "magnetic" blocks, and another alternative is for these blocks to be of a magnetic but not permanently magnetized material, with magnets being part of the carriers to be moved by the conveyor.

The "magnetic" blocks could be spaced apart by non-magnetic blocks so as to space the carriers moved by the conveyor, or all of the blocks could be magnetic, with the spacing of the carriers being determined by their placement on the conveyor.

Where solid block type of conveyors are used, it is desirable to provide for the blocks to fill the guideway continuously, and in order to facilitate travel of the blocks about vertical and/or horizontal turns, the ends of the blocks preferably have a cooperating ball and socket configuration which permits relative pivoting movement of adjacent blocks without substantial interruption to the continuity of the upper surface presented thereby.

It is a further object of my invention to provide a lubricated type of closely fitting block and guideway arrangement as broadly described above.

While I have referred to use of my novel type of conveyor arrangement in various types of indoor installations, it could be used to great advantage in numerous types of outdoor installations, where material is to be moved about over regularly used paths, such as in loading or unloading, ships, trains, aircraft, etc. Because of the construction of my conveying system, the possibility of damage from the weather would be slight.

The above and other objects of my invention will be apparent from the following specification when taken in conjunction with the accompanying drawings, in which:

Fig. 1 is a side elevational view of a portion of a conveyor constructed in accordance with my invention;

Fig. 2 is a cross sectional view taken through a portion of the conveyor shown in Fig. 1, and showing one manner in which magnets are used for transmitting power to pallets;

Fig. 3 is a detail side elevational view of a portion of Figure 1 with a side wall of the troughlike guideway omitted;

Fig. 4 is a view similar to Fig. 2, but showing a modified form of the invention;

Fig. 5 is a side elevational view showing another modified form of the invention;

Fig. 6 is a diagrammatic view showing the manner of imparting movement to the cable which carries the magnets;

Fig. 7 is a sectional view taken on line 7—7 of Fig. 6;

Fig. 8 is a longitudinal sectional view taken through a portion of a conveyor constructed in accordance with a further modification of the invention;

Fig. 9 is a cross sectional view taken on line 9—9 of Fig. 8;

Fig. 10 is a perspective view showing two of the blocks used in the embodiment of Figs. 8 and 9;

Fig. 11 is a cross sectional view taken on line 11—11 of Fig. 12, and showing still another modification;

Fig. 12 is a longitudinal sectional view, partly in elevation showing the structure of Fig. 11 with one of the side channel members removed; and Fig. 13 is a perspective view of one of the blocks used in the embodiment of Figs. 11 and 12.

In the drawings, Fig. 1 shows a section of a conveyor line in which carriers or work supports 10 are successively moved along a warehouse floor or through assembly or work stations (not shown). The carriers 10 ride on casters or wheels as shown at 11, although these casters or wheels may be replaced by rollers or other friction decreasing means carried either by the supports 10 or by the surface on which these supports ride. As shown in Figs. 1 to 3, the carriers 10 ride along a flat supporting surface 12 which covers a trough-like guideway 13, and which, for reasons which will be brought out presently, may be of thin stainless steel or other non-magnetic material. Alternatively, the support 12 may be constructed with a central insert of non-magnetic material.

The flat supporting and guideway covering member 12 is mounted above a trough-shaped guideway 13, so as to close the open side of the guideway. A cable 14, or other propelling means such as a chain or other appropriate structure moves within the guideway. Cable 14 carries at spaced intervals blocks 15 of non-magnetic material such as plastic, brass, aluminum, wood, or the like, and attached to these blocks are permanent magnets 16. As shown in Figs. 2 and 3, the ends of the magnet 16 extend a short distance above the upper surface of block 15, although this is not absolutely essential. Trough or guideway 13 may be of various sizes and shapes as required. It is desirable, but not essential, that blocks 15 are provided with a plurality of rollers 17 or other friction decreasing means, and these rollers run along the bottom and side walls of the troughlike guideway 13, and along the undersurface of the partition 12 which covers the trough 13. Blocks 15 are loosely mounted on the cable 14 so as to permit twisting of the cable relative to the blocks, and the blocks are maintained against sliding along the cable by means of collars 18 which are fixed to the cable by set screws (not shown) or other means, so that the blocks 15, and therefore magnets 16 move along the trough member 13 as the cable 14 is moved. A simple means for moving the cable 14 and blocks 15 will be disclosed presently.

As shown in Figs. 2 and 3, the rollers 17 are spaced equally about blocks 15, but it should be obvious that the positions of these rollers can be varied to suit the circumstances. The staggered relation of the rollers as shown in Fig. 3 is only for convenience of illustration, and my invention is not to be considered as limited to such a disposition. In practice, it may be desired to provide more than one roller on each surface of the blocks 15 or to use blocks that fit trough 13 so as not to require rollers, but which fit closely within the guideway and depend on lubrication to reduce friction. Such an embodiment will be disclosed in more detail, presently, and in such a structure, the provision of lubrication feeding means in the wall of the guide at spaced intervals may be desirable.

Each of the carriers 10 is provided with a piece of highly permeable magnetic material or a magnet 20 suspended below the undersurface of the carrier. In some cases it is desirable to space the piece of magnetic material or the magnet 20 a slight distance above the guideway cover 12 in order to decrease frictional drag and to prevent wear on the two pieces, but in other cases, it is desirable that the piece 20 slide or roll in contact with the cover 12. By using the high strength magnets now available, such as magnets of the "Alnico" type, the magnetic attraction between the magnet 16 and the piece 20 (which may be a magnet) is strong enough to cause movement of the carrier 10 as the magnet moves, even though the non-magnetic separator 12, and in some cases, air gaps, separate the magnet, the cover 12, and the piece 20.

Since the piece 20 may be either of highly permeable magnetic material, or may be a magnet, the use in the claims of expressions such as "an element attractable by said magnet," "an element of magnetic material," and other broad phrases, are intended to cover the making of piece 20 of either type of material.

A swivel mounting of the magnetic piece 20 is often of advantage in that it permits the carrier to be readily revolved in the conveyor line to accord the operators access to all sides of the work, although this swivel mounting is not a required feature of the invention. Neither is the sloping disposition of the magnet as shown in Fig. 3 an essential feature, although it is desirable in some cases.

It is obvious that in a conveyor for a warehouse, it may be desirable to position the magnetic material or magnet 20 near the leading end of the carrier to cause the carrier to follow without revolving during travel, or to mount the magnetic material or magnet 20 slightly off center and nearer to the leading end of the carrier so as to cause the carrier to travel without revolving, yet to enable operators to revolve it at will, when desired, at work stations.

In Fig. 4, I have shown other variations of the invention shown in Figs. 1 to 3. This figure shows the use of an electromagnet 22 mounted in the block 15, and receiving electricity for its winding from brushes 23 which slide along charged members 24 positioned in a wall of the trough 13. Figure 4 shows the conducting members 24 in the bottom wall of the trough, although it is obvious that these elements could be positioned in other walls, and if more convenient in certain applications, they could be positioned one in one wall, and the other in another wall.

Another variation shown by Figure 4 is the use of a magnet on the carrier 10, as shown at 25. The magnet is pivotally mounted at 26 on the under side of the carrier 10. In connection with the use of a magnet on the under side of the carriers, it should be pointed out that the arrangement of Figs. 1 to 3 could be reversed, that is, the magnet could be mounted on the carrier, and a piece of highly permeable magnetic material carried by the cable 14. It is also useful to provide magnets both in the blocks 15 and on carriers 10, the magnets being arranged so that they mutually attract each other and cause the carriers 10 to move with the cable 14.

It is obvious magnets may be of various sizes and shapes to suit the purpose of a particular conveyor or for convenience in manufacturing, without departing from this invention.

As shown in Fig. 5, the carrier 10 moving above trough 13 has universally mounted at 28 on its under surface a piece of highly permeable magnetic material 29, the piece 29 being supported near its rear end so that the forward end of the piece slides along the partition 12. The universal mounting 28 is important in eliminating variations in the force of attraction between the magnet and piece 29 resulting from unevenness of the surface upon which carrier 10 rides.

In Figs. 6 and 7, I have shown in somewhat schematic form an arrangement for transmitting power to the cable 14. In these drawings, there is shown a gear wheel 31 rotated by any suitable power source (not shown), and having split teeth as shown at 32 in Fig. 7. The cable 14 passes through the center of the split teeth 32, and these teeth thereby engage the blocks 15 and impart movement to the cable. If desired, the teeth and the blocks 15 may have complementary configurations for smoother operation. Other conventional drives, as the caterpillar type, may be used equally as efficiently, depending on the type, size and purpose of the conveyor.

While, as I have explained above, an important advantage of the invention is that it permits the elimination of power transmitting slots in conveyors, the invention can be used in the presence of such slots, thus permitting direct contact between the magnetic piece mounted on the carrier, such as 20, and the magnet moving with the cable, such as 16. In other words, it is not essential that there be any separation between the magnet and the piece of magnetic material, whether or not the magnet is mounted on the carrier or carried by the cable, or both. Naturally, where there is direct contact between the magnet and the piece of magnetic material, the force of attraction is stronger.

Referring now to the embodiment of the invention shown in Figs. 8-10, there is shown in these figures a conveyor using the force of magnetic attraction to cause one or more carriers of any of the above described types to move with the driven elements of the conveyor. This embodiment is particularly suited for use in the floors of warehouses or other installations where heavy loads are likely to be imposed on the conveyor structure, as by the passage of trucks or other heavy equipment over the parts of the conveyor located in the floor.

As shown in Figs. 8-10, the floor or other structure in which the conveyor is situated may be of concrete or other high load sustaining material as shown at 40. At the time the cement is poured, a guideway 41, which may be a continuous seamless tube of sheet metal or other suitable material, is placed in the floor with the upper surface of the guideway approximately flush with the floor surface. The side walls of the guideway have continuous, laterally projecting grooves or cavities 42 formed therein for a purpose which will be explained presently.

Within the guideway ride a series of blocks 43, each, or at least some of which carry a magnet 44 or a piece of magnetic material. The blocks may be of any suitable material as in the case of the blocks in the other embodiments of the invention. The blocks 43 each have a laterally extending flange 45 on each side wall for the purpose of cooperating with the projections or notches 42 formed in the side walls of the guideway 41. These cooperating flanges and notches take a considerable amount of the upward pressure on the blocks caused by magnetic force. If desired, the grooves can be provided in the blocks for cooperation with projections on the side walls of the guideway 41, that is, just the opposite of the arrangement shown.

Blocks 43 are formed at their ends with ball and socket configurations as shown at 46 and 47 to permit retention of a substantially continuous upper surface during relative movement between adjacent blocks when making horizontal or vertical turns, thus forming a continuous articulated structure. As is apparent from Fig. 8, the blocks are positioned closely adjacent one another on a cable or chain 48 which passes through an axial opening in each block. The blocks are attached to the cable for movement therewith by set screws (not shown) or other suitable means.

To provide means for moving the conveyor, each block may have an indentation 50 in its lower surface which can be engaged by a rotating gear wheel or other suitable type of driving arrangement (not shown).

A heavy lubricant is used in the guideway 41 to facilitate movement of the blocks therein, and in order to assist the blocks in making turns, rollers may be provided in the walls of the guideway at such points. The blocks 43 or the guideway may conveniently have grooves for facilitating distribution of lubricant, which may be forced in by pressure.

A slightly different construction is shown in Figs. 11–13 wherein the floor 60 contains a pair of spaced channel members 61 placed on edge facing each other to form a guideway. Channel members 61 may be held in place by bolts or screws 67. The blocks 62 used with this modification are dimensioned to fit closely, but movably within the guideway, and with an upwardly projecting flange 63 which rides between the upper portions of channel members 61 with its upper surface flush with the level of the floor. The blocks 62 have ball and socket end structures as shown at 64 and 65, and the blocks are moved by a cable similar to the structure of Figs. 8–10. Suitable heavy lubricants are used in the guideway to decrease friction, and rollers (not shown) may be used at turns in the conveyor.

This embodiment is intended for use where a protective cover is not particularly necessary, but it is obvious that a cover could be placed over the space between the channel members, if desired. In some cases, it may be desirable to dimension blocks 62 so that the upper surfaces of flanges 63 are positioned below the surface of the floor sufficiently that vehicles passing over the space between members 61 will not bear upon the blocks 62.

In the structure shown in Figs. 11–13, the blocks 62 may be of non-magnetic material with magnets mounted therein, or the blocks may be formed as magnets or out of magnetic material. With no covering for the guideway, direct contact between the magnet and the element attractable by the magnet is permitted.

In Figs. 12 and 13, a magnet 70 is shown in one of the blocks with its pole faces exposed at 71.

I wish it to be understood that I realize fully that my invention is subject to numerous variations without departing from the inventive concept, and it is my intention to cover by my patent all variations of the disclosure thereof which fall within the inventive concept as defined by the appended claims.

I claim:

1. In conveying apparatus, movable carrier means, driven means for imparting movement to said carrier means, a magnet carried by said driven means, and a piece of magnetic material supported through a universal joint by said carrier means in proximity to said magnet, whereby a magnetic connection is established for transmitting movement to said carrier means from said driven means, said universal joint eliminating variations in the force of attraction between said magnet and said piece of magnetic material resulting from unevenness in the path of movement of the carrier means and also facilitating rotation of said carrier means.

2. In conveying apparatus, an elongated troughlike guideway, flexible driven means movable in said guideway, at least one block of non-magnetic material mounted on and movable with said flexible means in said guideway, rolling means carried by said block for guiding the block along said guideway, a magnet attached to said block, a carrier movable along a path parallel to and in proximity to said guideway, and a quantity of magnetic material carried by the portion of said carrier nearest said guideway for attraction by said magnet cause movement of said carrier with said magnet.

3. In conveying apparatus, the combination set forth in claim 19, said guideway being open on the side nearest the path of movement of said carrier, and a thin cover of non-magnetic material closing said open side and separating said magnet from said quantity of magnetic material.

4. In conveying apparatus, the combination set forth in claim 19, said magnet being an electromagnet, charged conducting elements mounted in the walls of said guideway, and means carried by the block for movement in contact with said conducting elements to supply electricity to said electromagnet.

5. In conveying apparatus for transporting carrier means through predetermined movements, driven means for imparting movement to said carrier means, a guideway for said driven means, a magnet carried by one of said means, and an element attractable by said magnet carried by the other of said means, said driven means having sufficient clearance to permit the presence of lubrication to decrease friction between the two.

6. In conveying apparatus, wall means forming a guideway of substantially closed cross-section, elongated flexible, driven means movable in said guideway in an axial direction, at least one movable element attached to said driven means and movable in said guideway, said movable element having a profile in cross-section closely approximating that of the interior of said guideway, carrier means movable along a path parallel to said guideway, and magnetically attracted means carried on the one hand by said carrier means, and on the other hand forming part of said movable element for establishing a magnetic driving connection between said movable element and said carrier means, whereby movement of said movable element is imparted to said carrier means.

7. In conveying apparatus for industrial use in moving articles over a factory floor or like surface, carrier means, an elongated guideway disposed directly beneath said surface so as to leave said surface unobstructed, said guideway defining the path of travel of said carrier means along said surface, driven means disposed in said guideway and movable therealong, and a magnetic connection between said carrier means and at least a portion of said driven means for causing movement of said carrier means with said driven means.

8. In conveying apparatus as defined in claim 7, said portion of said driven means being a magnet.

9. In a conveying apparatus, a guideway, power driven means movable in said guideway, carrier means movable along a path parallel with said guideway, an element carried by said driven means in said guideway, a rotatable support on said carrier means, a second element carried by said support, at least one of said elements being magnetic and the other being magnetically attractable, whereby a magnetic connection is provided for imparting movement from said driven means to said carrier means.

10. In a conveying apparatus, a guideway, power driven means movable in said guideway, carrier means movable along a path parallel with said guideway, an element attached to said driven means in said guideway, a second element carried by a portion of said carrier means adjacent to the path of travel of said first element, one of said elements being magnetic and the other being attractable by magnetic force, whereby a magnetic connection is provided for imparting movement from said driven means to said carrier means, the side of said guideway adjacent said carrier means being open, and a covering of non-magnetic sheet material closing said open side and separating said magnet and said element of magnetically attractable material.

11. In conveying apparatus for transporting carrier means along a surface, a guideway positioned below said surface, driven means positioned within said guideway for movement therealong, means carried by said carrier means and said driven means for forming a magnetic connection therebetween whereby said carrier means moves with said driven means, said driven means including articulated elements.

12. In conveying apparatus for transporting carrier means along a surface, a guideway positioned below said surface, driven means positioned within said guideway for movement therealong, means carried by said carrier means and said driven means for forming a magnetic connection therebetween whereby said carrier means moves with said driven means, said driven means including articulated elements, said articulated elements having cooperating ball and socket portions facilitating relative movement therebetween.

13. In conveying apparatus for transporting carrier means along a surface, a guideway positioned below said surface, driven means positioned within said guideway for movement therealong, means carried by said carrier means and said driven means for forming a magnetic connection therebetween whereby said carrier means moves with said driven means, said driven means including articulated elements, said articulated elements having cooperating ball and socket portions facilitating relative movement therebetween, said articulated elements having approximately the cross-sectional internal configuration of the guideway.

14. In conveying apparatus for transporting carrier means along a surface, a guideway positioned below said surface, driven means slidably positioned within said guideway, means carried by said carrier means and said driven means for forming a magnetic connection therebetween whereby said carrier means moves with said driven means, cooperating means on said driven means and said guideway to receive upward pressure on said driven means caused by magnetic force, whereby friction between said driven means and said surface is reduced.

15. In conveying apparatus for transporting carrier means along a surface, a guideway positioned below said surface, driven means slidably positioned within said guideway, means carried by said carrier means and said driven means for forming a magnetic connection therebetween whereby said carrier means moves with said driven means, said guideway comprising a pair of spaced channel members on edge with their channels facing each other, and a projection on said driven means extending into the space between said channel members at the top thereof to close said space.

16. In conveying apparatus for transporting carrier means along a surface, a guideway positioned below said surface, driven means slidably positioned within said guideway, means carried by said carrier means and said driven means for forming a magnetic connection therebetween whereby said carrier means moves with said driven means, said guideway comprising a pair of spaced channel members on edge with their channels facing each other, and a projection on said driven means extending into the space between said channel members at the top thereof to close said space, said projection terminating a short distance below said surface whereby the weight of vehicles crossing the space between said channel members is imposed substantially entirely on said channel members and the surrounding surface.

17. In conveying apparatus, a guideway, at least one movable element movable in said guideway, means for moving said element in said guideway axially thereof, carrier means movable along a path parallel to said guideway, said guideway and said movable element having means for maintaining said element during its travel in said guideway substantially adjacent that surface thereof which is nearest to the path of movement of said carrier means, and magnetically attracted means carried on the one hand by said carrier means and on the other hand forming part of said movable means for establishing a magnetic driving connection between said movable element and said carrier means, whereby movement of said movable element is imparted to said carrier means.

18. In conveying apparatus, a guideway, driven means movable in said guideway, at least one element mounted on and movable with said driven means in said guideway for guiding the driven means along said guideway, a carrier movable along a path parallel to and in proximity to said guideway, a second element carried by a portion of said carrier adjacent said guideway, one of said elements being magnetic and the other being attractable by magnetic force so as to cause movement of said carrier with said driven means.

19. In conveying apparatus for industrial use in moving articles over a surface, an elongated guideway, means movable in said guideway, at least one block of non-magnetic material mounted on and movable with said movable means in said guideway, a magnet attached to said block, a carrier movable parallel to and in proximity to said guideway, and an element of magnetic material carried by a portion of said carrier adjacent said guideway for attraction by said magnet to cause movement of said carrier with said magnet.

20. In conveying apparatus for industrial use in moving articles, comprising an unobstructed surface, guided driven means movable in a predetermined path beneath said surface, an element attached to said driven means, a carrier movable along a path on said surface and parallel to and in proximity to said driven means, a second element carried by a portion of said carrier adjacent to said driven means, one of said elements being an alloy magnet and the other being attractable by magnetic force, so as to cause movement of said carrier with said driven means.

21. In conveying apparatus for industrial use in moving articles as in article transferring, manufacturing, finishing and like processes, an elongated guideway, means movable in said guideway, at least one block of non-magnetic material movable with said means in said guideway, friction-reducing means facilitating movement of said block, a magnet attached to said block, a carrier movable parallel to and in proximity to said guideway, and a quantity of magnetic material carried by a portion of said carrier adjacent said guideway for attraction by said magnet to cause movement of said carrier with said magnet.

ALBERT R. DE BURGH.

(References on following page)

REFERENCES CITED

The following references are of record in the file of this patent:

UNITED STATES PATENTS

| Number | Name | Date |
|---|---|---|
| 672,663 | Baxter | Apr. 23, 1901 |
| 1,071,847 | Wilson | Sept. 2, 1913 |
| 1,312,632 | Huerta | Aug. 12, 1919 |
| 1,323,892 | Mason | Dec. 2, 1919 |
| 1,719,231 | McLaren | July 2, 1929 |
| 2,092,927 | Merwitz | Sept. 14, 1937 |
| 2,144,835 | Dickinson | Jan. 24, 1939 |
| 2,239,395 | Mallory | Apr. 22, 1941 |
| 2,486,273 | Gibson | Oct. 25, 1949 |

FOREIGN PATENTS

| Number | Country | Date |
|---|---|---|
| 575,309 | Germany | Apr. 27, 1933 |
| 642,099 | Germany | Feb. 22, 1937 |